United States Patent
Volz et al.

(10) Patent No.: US 6,298,911 B1
(45) Date of Patent: Oct. 9, 2001

(54) METHOD AND APPARATUS FOR AUTOMATIC CONTROL OF MOTOR VEHICLE CLIMATE CONTROL HAVING SEVERAL OPERATING MODES

(75) Inventors: Wolfgang Volz, Magstadt; Dieter Heinle, Pluederhausen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/167,983

(22) Filed: Oct. 8, 1998

(30) Foreign Application Priority Data

Oct. 8, 1997 (DE) .............................. 197 44 414

(51) Int. Cl.⁷ .............................. F25B 29/00; B60H 1/24; B60H 1/00; G06F 17/00
(52) U.S. Cl. .............................. 165/202; 165/42; 165/43; 236/91 C; 236/51; 236/49.3; 701/36; 701/213
(58) Field of Search .............................. 165/202, 42, 43; 236/91 C, 51, 49.3; 237/8 R; 701/213, 36

(56) References Cited

U.S. PATENT DOCUMENTS

| | | | |
|---|---|---|---|
| 4,460,035 | * | 7/1984 | Mizote et al. .................... 165/42 |
| 4,921,163 | * | 5/1990 | Viessmann .................... 237/8 R |
| 5,170,935 | * | 12/1992 | Federspiel et al. .................... 236/91 C |
| 5,187,943 | * | 2/1993 | Taniguchi et al. .................... 236/91 C |
| 5,344,070 | | 9/1994 | Akasaka et al. . |
| 5,553,661 | * | 9/1996 | Beyerlein et al. .................... 165/43 |
| 5,810,078 | * | 9/1998 | Knutsson et al. .................... 236/91 C |
| 5,878,809 | * | 3/1999 | Heinle .................... 236/91 C |
| 6,108,602 | * | 8/2000 | Bairamis .................... 701/36 |

FOREIGN PATENT DOCUMENTS

| | | |
|---|---|---|
| 19619643 C1 | 7/1997 | (DE) . |
| 2305262 * | 4/1997 | (GB) . |
| 4-201712 * | 7/1992 | (JP) . |
| 173 071/1993 | 7/1993 | (JP) . |

OTHER PUBLICATIONS

International Standard ISO 7730 $2^{nd}$ Edition (1994) Moderate Thermal Environments—Determination of the PMV and PPD Indicies and Specification of the Conditions for Thermal Comfort ISO7730:1994.*
Computer translation of Japanese patent document 178 071 dated 1993.

* cited by examiner

*Primary Examiner*—John K. Ford
(74) *Attorney, Agent, or Firm*—Crowell & Moring LLP

(57) ABSTRACT

A method and apparatus for automotive climate control includes a control unit which automatically sets the particular operating mode of the automotive climate control system according to a predeterminable region of operation for the motor vehicle or to the region in which the vehicle is currently situated. The automotive climate control system has a plurality of operating modes which can be selected by the control unit.

19 Claims, 2 Drawing Sheets

METHOD AND APPARATUS FOR AUTOMATIC CONTROL OF MOTOR VEHICLE CLIMATE CONTROL HAVING SEVERAL OPERATING MODES

BACKGROUND AND SUMMARY OF THE INVENTION

This application claims the priority of 197 44 414.8, filed Oct. 8, 1997, the disclosure of which is expressly incorporated by reference herein.

The invention relates to a motor vehicle climate control system with several operating modes which can be selected by a control unit.

U.S. Pat. No. 5,344,070 discloses a motor vehicle climate control system of this generic type which automatically selects an operating mode in accordance with several temperature and received light sensors, and sets the position of a temperature selection switch.

German patent document DE 196 19 643 C1 on the other hand discloses a motor vehicle with an automotive climate control apparatus which can be operated according to whether the vehicle is in an uncovered area of a highway system. A navigation system is provided for continuously determinating the precise position of the vehicle, so that particularly the topographic location of the vehicle in the environment is known, and the automotive climate control apparatus and additional functional units can be operated accordingly. For example, obstructions above roadways, such as tunnels, viaducts and other buildings are mentioned which might require changing the operation of the air conditioning and to which a reaction might be made via the proposed air conditioning control.

An object of the present invention is to provide an improved motor vehicle climate control system of the kind referred to above, which is capable of providing atmospheric conditions that are comfortable.

This and other objects and advantages are provided by the motor vehicle control system according to the invention, in which a control unit automatically sets its operating mode in accordance with a region that can be preset for the vehicle or by the region in which the vehicle is situated. This facilitates an automatic adaptation of the operating mode of the motor vehicle climate control system to the region in which the vehicle is operating, and thus to a particular user group or climatic region. The control unit is thus capable of automatically selecting, from any desired number of possible operating modes, an operating regimen of the motor vehicle climate control system that is adapted to the region in which the motor vehicle is operating. As a result, the working parameters of the motor vehicle climate control system to be set by the user can be reduced. This improves the convenience of the climate control system and the overall comfort level that the apparatus can provide.

In a embodiment of the climate control system according to the invention, the control unit is configured such that it establishes specific preset temperature levels which directly or indirectly describe the desired climate for riders of the vehicle, and/or sets specific performance parameters for the motor vehicle climate control system. This setting is in turn implemented in accordance with a preselected or the current actual (real-time) region in which the motor vehicle is operating. As a result, a preselection is performed which makes it easier for the users of the motor vehicle to control the climate in the motor vehicle.

In another embodiment according to the invention, the climate control system automatically detects the momentary location of the vehicle, so that it can automatically identify the region in which the vehicle is eventually situated. This permits continuous adjustment of the working regimen of the motor vehicle climate control system as the vehicle changes location, which thereby assures that the right region-related regimen of operation is turned on.

Other objects, advantages and novel features of the present invention will become apparent from the following detailed description of the invention when considered in conjunction with the accompanying drawings.

DETAILED DESCRIPTION OF THE DRAWINGS

Figure 1:
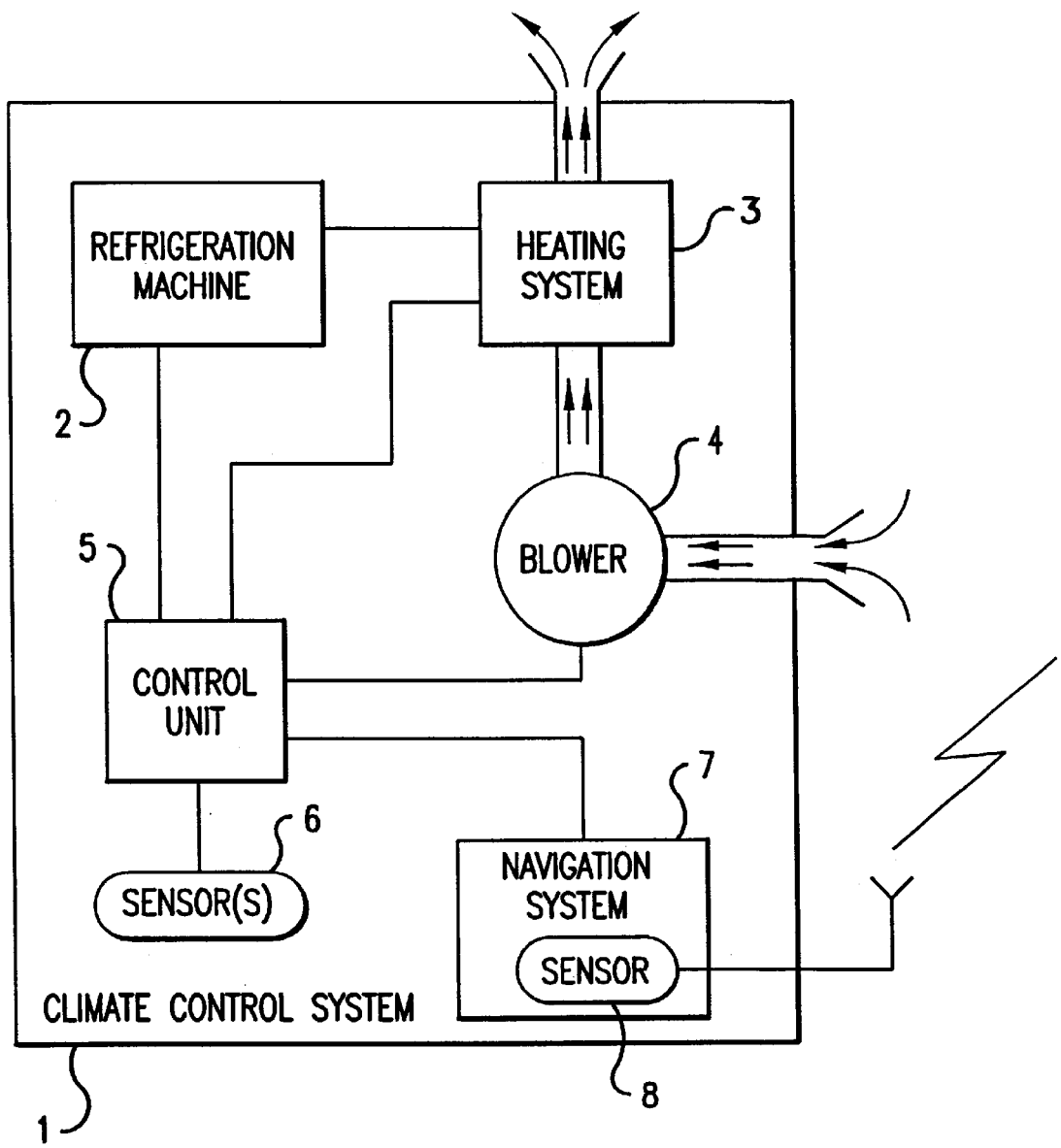
FIG. 1 shows a schematic block diagram of a system for implementing the method according to the invention.

In FIG. 1, an automotive climate control system 1 for controlling the climate of an automobile interior has a refrigeration machine 2 capable of operating as a heat pump, and a heating system 3 which brings an air stream aspirated by a blower 4 from the ambient atmosphere to a certain temperature (the so-called incoming air temperature). This enables adjustment of the temperature of the interior space via this "tempered" air stream.

A control unit 5 is associated with the automotive climate control system 1 and sets its performance parameters, including, for example, the power outputs of the air blower 4, the refrigeration machine 2 and the heating system 3. A change in the value of at least one of these performance parameters directly produces a change in the temperature of the incoming air and thus, at least indirectly, a change of the interior space temperature.

The performance parameters are established by the control unit 5 based on a pre-established value for the temperature of the incoming air. Sensors 6 for detecting levels of the ambient climate and the actual interior space climate supply the control unit 5 with information for determining the deviation especially of the vehicle interior temperature from its set level.

In accordance with the invention, different regional plots between at least one of the performance parameters of the climate control system 1 and the deviation from the level sensed by the control unit 5 are predetermined. Here, a particular plot is associated in each case with a specific set region of operation for the vehicle.

Figure 2:
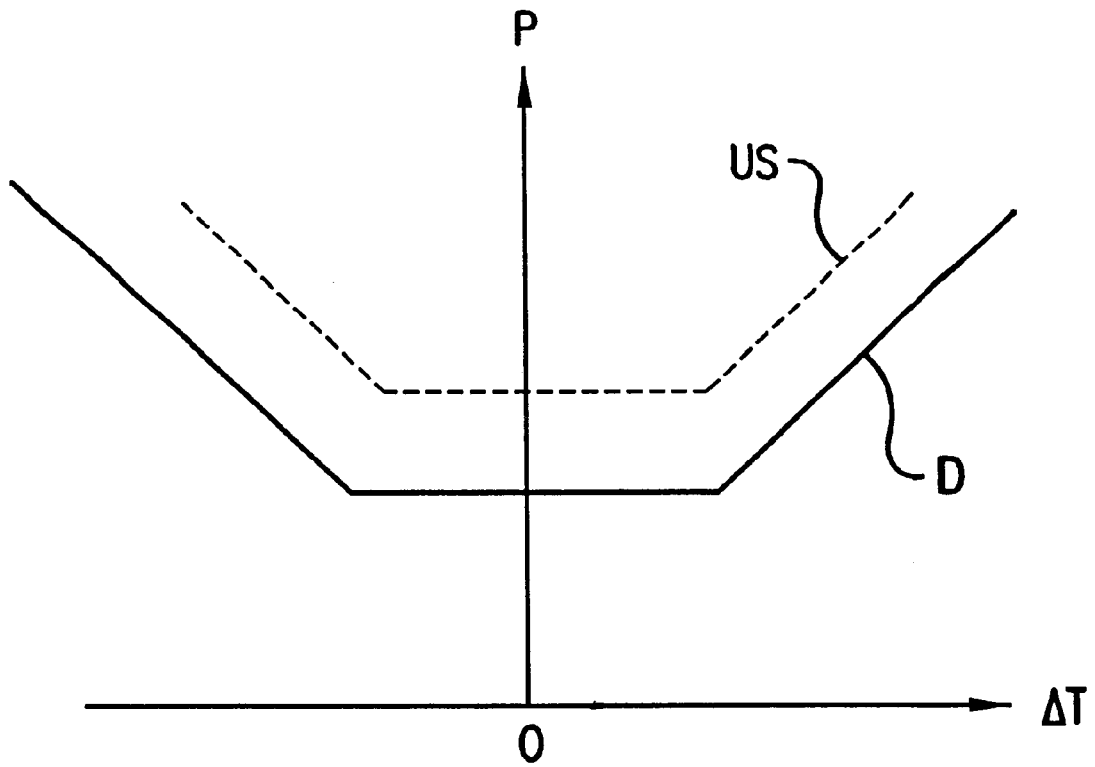
FIG. 2 shows a diagram of the blower output of an automotive climate control system in relation to a departure from a set temperature for two different operating modes of the automotive climate control system.

Shown in FIG. 2, for example, are two such plots of the power P of the air blower 4 and the difference ΔT between the set value and the interior temperature of the passenger compartment of the vehicle. The first plot D is given for the region of Germany. The second plot US, on the other hand is for the United States. Thus there are two different national variants for the automotive climate control system 1 of the invention, which accommodates the different climatic preferences of the populations of these countries. As seen from FIG. 1, this is accomplished by increasing the power P of the air blower 4 in the US plot provided for the USA in comparison to the plot D. Here, it is assumed that the population of the USA typically desires and finds pleasant a stronger level of air-conditioning, i.e., a faster and greater interior cooling and a greater cooling air current. Furthermore, provision is made for modifying the plots between the output of the refrigeration machine 2 and heating system 3 in a national variant provided for the USA in comparison to a national variant designed for Germany.

The national variants thus defined can be considered as operating modes of the automotive climate control system 1, from among which the appropriate operating mode of the automotive climate control system 1 (the plot D, for example) is automatically selected and set by the control unit 5 based on information on the region of operation (Germany, for example). Such classification of the operating modes according to national variants can also be replaced by a classification based on regions or geographic latitudes and the climatic preferences of those who live and drive the vehicle in a particular region.

The control unit 5 is furthermore associated with a navigation system 7 having a sensor 8 for receiving GPS signals, thereby making it possible for the control unit 5 to automatically identify the region in which the vehicle is situated. The control unit 5 can thus at any time determine the current location of the vehicle and, based on this information, accordingly select and establish an operating mode for the automotive climate control system 1. It is advantageous to define climate or cultural zones and associate with such zones a set of plots which individually establish the operating mode for the various climate or cultural zones. The control unit 5 then identifies the climate or cultural zone within which the detected location of the motor vehicle is operating.

In a modified embodiment according to the invention, provision is made for characterizing a particular operating mode of the automotive climate control system 1 in addition to or alternatively to the plots US and D for the air blower power by a preset value for the interior temperature of the motor vehicle or for the temperature of the entering air stream that is variable according to specific regions. Provision is furthermore made for setting, in a largely permanent manner, one of the performance parameters of the automotive climate control system 1 according to the region in which the vehicle is operating. This can be set especially for the performance of the air blower 4, which has an especially lasting effect on important properties of the incoming air stream.

Thus, according to the invention, the average preference of the user of the vehicle, typical of the region of operation of the motor vehicle, is arrived at by the air conditioner's control unit 5 based on the region of operation of the motor vehicle. Hence, the climate control system 1 of the vehicle is adjusted to an operating mode which makes allowances for this preference in a special manner. The operation of the climate control system 1 is thus simplified and made easier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A climate control system for a vehicle, comprising:
   a control unit having stored therein information defining a plurality of geographic regions, and for each one of said geographic regions at least one operating characteristic for controlling operational parameters of said climate control system, which at least one characteristic is adapted to satisfy climatic preferences of a population indigenous to said one of said geographic regions; and
   a device for indicating a geographic region in which said vehicle is to be operated;
   wherein the control unit automatically operates the climate control system according to an operating characteristic based on information concerning a geographic region indicated via said device.

2. The system according to claim 1, wherein the control unit automatically establishes a set value for at least one of an interior temperature of the motor vehicle, a temperature of an air stream to be blown into the motor vehicle interior, an output power of an air blower, an output power of a refrigeration machine and an output power of a heating system of the climate control system.

3. The system according to claim 1, wherein the device comprises a navigation system coupled to the control unit for automatic determination of the geographic region in which the motor vehicle is situated.

4. The system according to claim 2, wherein the device comprises a navigation system coupled to the control unit for automatic determination of the geographic region in which the motor vehicle is situated.

5. The system according to claim 3, wherein the navigation system comprises a GPS system.

6. An automatic climate control system for a vehicle, comprising:
   a control unit having stored therein information defining a plurality of geographic regions, and for each one of said geographic regions at least one operating characteristic for controlling operational parameters of said climate control system, which at least one characteristic is adapted to satisfy climatic preferences of a population indigenous to said one of said geographic regions;
   a refrigeration machine coupled to the control unit;
   a heating system coupled to the control unit;
   at least one ambient climate condition sensor coupled to said control unit;
   a blower coupled to the heating system and the control unit; and
   a device coupled to the control unit for indicating a geographic region in which said vehicle is to be operated;
   wherein said control unit automatically operates the climate control system according to an operating characteristic based on information concerning a geographic region indicated via said device.

7. The system according to claim 6, wherein the device comprises a navigation system having a second sensor for receiving GPS signals.

8. The system according to claim 7, wherein the navigation system is a GPS system for an automatic determination of a region in which the motor vehicle is situated.

9. The system according to claim 6, wherein the control unit automatically establishes a set value for at least one of an interior temperature of the motor vehicle, a temperature of an air stream to be blown into the motor vehicle interior, an output power of an air blower, an output power of a refrigeration machine and an output power of a heating system of the climate control system.

10. A method for operating an automatic climate control system for a vehicle, having a control unit, comprising:
    storing in said control unit information defining a plurality of geographic regions, and for each one of said geographic regions at least one operating characteristic for controlling operational parameters of said climate control system, which at least one characteristic is adapted to satisfy climatic preferences of a population indigenous to said one of said geographic regions; and identifying a geographic region in which the vehicle is currently situated, from among said plurality of geographic regions;

said control unit operating the climate control system according to an operating characteristic for an identified geographic region.

11. The method according to claim 10, further comprising:

establishing in the control unit a set value for at least one of an interior temperature of the motor vehicle, a temperature of an air stream to be blown into a motor vehicle interior, an output power of an air blower, an output power of a refrigeration machine, and a heating system of the climate control system, in accordance with the identified geographic region.

12. The method according to claim 10, further comprising the act of:

providing a vehicle position identifying system coupled to the control unit, for automatically determinating the region in which the motor vehicle is situated.

13. The method according to claim 11, further comprising the act of:

providing a vehicle position identifying system coupled to the control unit, for indicating the region in which the motor vehicle is situated.

14. The method according to claim 10, wherein the vehicle position identifying system is a GPS system.

15. A method of operating a climate control system for a vehicle, comprising:

determining representative climatic preferences of populations indigenous to a plurality of geographic regions in which the vehicle may be operated;

for each of said geographic regions, determining at least one operating characteristic for controlling operational parameters of said climate control system, which at least one characteristic is adapted to satisfy the climatic preferences of the population indigenous thereto;

determining a geographic region in which the vehicle is to be operated; and operating said climate control system in accordance with an operating characteristic for the geographic region in which the vehicle is currently operated.

16. A climate control system for a vehicle, comprising:

a control unit having stored therein information defining a plurality of geographic regions in which the vehicle may be operated, and for each one of said geographic regions at least one operating characteristic for controlling operational parameters of said climate control system, which at least one characteristic is adapted to satisfy climatic preferences of a population indigenous to said one of said geographic regions;

wherein the control unit automatically operates the climate control system according to an operating characteristic based on information on the geographic region in which the vehicle is currently operated.

17. The system according to claim 16, wherein the control unit automatically establishes a set value for at least one of an interior temperature of the motor vehicle, a temperature of an air stream to be blown into the motor vehicle interior, an output power of an air blower, an output power of a refrigeration machine and an output power of a heating system of the climate control system.

18. The system according to claim 16, further comprising a navigation system coupled to the control unit for automatic determination of the geographic region.

19. The system according to claim 18, wherein the navigation system comprises a GPS system.

* * * * *